June 11, 1963 A. H. BOBECK 3,093,745

MAGNETIC CORE FLIP-FLOP

Filed Sept. 13, 1957

INVENTOR
A. H. BOBECK
BY
John E. Cassidy
ATTORNEY

United States Patent Office 3,093,745
Patented June 11, 1963

3,093,745

MAGNETIC CORE FLIP-FLOP

Andrew H. Bobeck, Chatham, N.J., assignor to Bell Telephone Laboratories, Incorporated, New York, N.Y., a corporation of New York Filed Sept. 13, 1957, Ser. No. 683,761
8 Claims. (Cl. 307—88)

This invention relates to magnetic core circuitry and more particularly to such circuits as exhibit two stable modes of operation.

The type of circuit referred to may be employed as a flip-flop, a device having two stable states and two input terminals (or types of input signals) each of which corresponds with one of the two states; a counter, a device capable of changing from one to the next sequence of distinguishable states upon each receipt of an input signal; or a storage device in which information may be stored. Although certainly applicable in many fields, the circuitry of this invention may find its greatest utility in the computer art. In this art, as is well known, there is a great demand for components exhibiting properties of high reliability, long life, and low power consumption. These properties, to a large extent, are made necessary by the multitude of components of a relatively similar nature such as, flip-flops, cathode followers, and logic circuitry found in computer apparatus. Due to the nature of such equipment, it is also evident that simplicity of individual circuits gives rise to consderable economy and efficiency, as the removal of a single resistor from a standard flip-flop circuit used thousands of times may effectively result in the removal from the entire computer unit of thousands of such resistors. Still another desirable property, which has been sought but not yet completely found, is a means of retaining the information present in a particular unit when power fails.

The contemporary art has demonstrated the ability of magnetic core circuitry to provide the means of answering these demands. These cores are particularly applicable to computer use because of their ability to handle bivalued information.

Accordingly it is an object of the present invention to provide a flip-flop that does not utilize electronic tubes, more specifically, to provide a magnetic core flip-flop using a minimum number of components.

Another object of the present invention is to provide an improved magnetic core flip-flop circuit using only one magnetic core.

Still another object of the present invention is to provide a magnetic core circuit suitable for use as a memory device with the property of nondestructive read out.

The present invention is, therefore, a magnetic core circuit, wherein the aforementioned objects are attained. Basically, this invention makes possible the utilization of magnetic cores under symmetrical driving conditions to obtain nonsymmetrical outputs in accordance with particular input conditions. This is achieved by coupling energy storage means to a magnetic core in such a fashion as to enhance the switching action periodically induced by matched driving means.

A feature of this invention is the provision of means whereby the output of the magnetic core circuit is controlled to indicate the temporary occurrence of a particular state in the input circuit.

More specifically, a feature of this invention is the provision of energy storage means connected to a magnetic core to provide a bi-stable circuit, which yields a nonsymmetrical output indicative of conditions established at the inputs.

As illustrated in the particular illustrative embodiment of this invention disclosed hereinafter, an aspect of the present invention is the use of a capacitor in conjunction with a switching enhancing winding, or even the inherent capacity of such a winding, to provide a switching enhancing means sufficiently effective to maintain an unsymmetrical condition which has been momentarily impressed on a normally symmetrical input drive.

The foregoing, as well as additional objects and features, will be more clearly understood and appreciated from the description below made in conjunction with the drawings, wherein.

Figure 1:
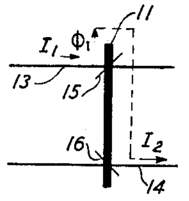
FIG. 1 depicts the "mirror" symbol notation employed in the drawings to represent the circuit elements in the illustrative embodiment of this invention.

FIG. 1 is illustrative of the notation employed in the drawings of this invention and described by M. Karnaugh in his article, "Pulse-Switching Circuits Using Magnetic Cores," Proceedings of the IRE, volume 43, pages 570–583, May 1955. This notation offers a convenient means of determining the polarity of induced voltages or the direction of current flow in the secondary windings on a magnetic core. In FIG. 1, the magnetic core is represented by heavy vertical line 11 and the conductors by horizontal lines 13 and 14. The core windings are represented by short lines 15 and 16, intersecting the conductors and cores at an angle of 45 degrees. These short lines are termed "mirror" symbols and the orientation of the angle corresponds to the sense of the winding with reference to the direction of current flow. When a current such as $I_1$ flows in conductor 13, the direction of the resulting magnetic flux arising from the current in the winding is determined by "reflecting" the current in the winding "mirror" 15. This flux has been depicted in FIG. 1, as $\Phi_1$. Throughout the following description, such an upward flux direction will be referred to as a positive polarization of the core. In order to ascertain the direction of the current induced in other windings on the core, the flux $\Phi_1$ is projected around the end of the core symbol 11 as shown, and reflected in the "mirror" representative of the other winding, for example, 16. The current produced therein, $I_2$, is illustrated in FIG. 1.

Figure 3:
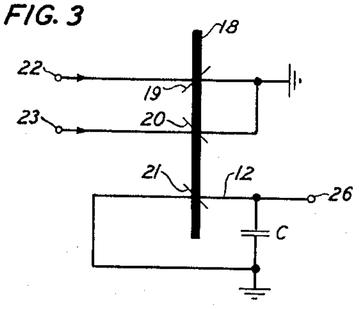
FIG. 3 is a schematic diagram of the basic bi-stable circuit employed herein.

FIG. 3 shows a circuit which exhibits the bistable condition essential to the operation of this invention. It is composed of a single magnetic core 18 with three windings, 19, 20, and 21 thereon. A capacitor C bridges winding 21. Input pulses may be applied at terminals 22 and 23, and an output voltage will be available at terminal 26, the nature of such inputs and output being depicted in FIG. 4 as current pulse trains 24 and 25 and voltage waveform 27 respectively. In operation pulse train 24 is applied to terminal 22 and pulse train 25 is applied to terminal 23. Windings 19 and 20 are of opposite sense, yet are arranged so that when pulse trains 24 and 25 are applied to terminals 22 and 23 respectively, the core is symmetrically driven, that is, the ampere turn drive of each coil is the same. Consideration of voltage waveform 27, however, will indicate that the positive peaks occurring in phase with current pulses 24 are larger than the negative peaks occurring in phase with current pulses 25. The explanation of this asymmetry resides in the inherent response of symmetrically driven magnetic cores when driven nonsymmetrically during one cycle of operation. This response evidences itself in the following manner: if the peak amplitude of current pulses 25 is held constant and that of current pulses 24 is increased, the peak voltage output due to current pulses 25 will decrease.

Figure 2:
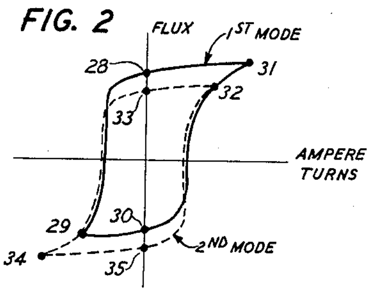
FIG. 2 is a diagram of a hysteresis loop illustrating the magnetic path of operation experienced by the magnetic core employed in this invention.

Before further describing the reason this nature of output occurs, it should be pointed out that the magnetic cores employed in this invention are advantageously of the well-known ferrite or magnetic-tape type, exhibiting a substantially rectangular hysteresis characteristic such as illustrated in FIG. 2, and are capable of remaining in either of two conditions to which switched by an applied magnetomotive force. It should be further noted, that the capacitor C may in actual operation be merely the distributed capacitance of the windings of coil 21.

Returning to FIG. 3, upon application of current 24, capacitor C charges until the voltage at terminal 26 reaches a maximum value after which it discharges through winding 21 and aids current 24 in switching the core. Considering the "mirror" symbols, the flux produced by current 24 polarizes core 18 positively. During this polarization, current is induced in winding 21 charging capacitor C positively, that is, with the positive voltage on its uppermost plate; having reached maximum potential, capacitor C then discharges through winding 21 causing current to flow in conductor 12 from right to left, as viewed in the drawing. As the "mirror" symbols indicate, this induces a flux which aids that originally induced by current 24. The amplitude of the aiding ampere-turn drive contributed by the current of capacitor C is a function of the value of capacitor C.

Turning to FIG. 2, the net result of this boost drive would be to leave the core at a remanent flux state 28, which is somewhat above normal. When current 25 is applied to the core its effect is to reverse the polarity, driving the core almost to point 29 on the hysteresis curve. Again capacitor C is charged and during discharge aids in the switching action. However, because the core was originally switched somewhat further positive than it would have been without the previous aid from the charge on capacitor C, the effect of current 25 in inducing a switching voltage in winding 21 to charge capacitor C is less than that of current 24; and subsequently, the degree of negative saturation achieved is less than that experienced in the positive direction. The negative saturation reached by this cumulative negative polarizing force is depicted as point 29. At the termination of the switching action, the core goes to remanent magnetic state 30. Reapplication of a pulse at terminal 22 will in the fashion hereinbefore described drive the core from point 30 to point 31 on the hysteresis loop and upon termination of the switching action, leave it in remanent state 28. Subsequent application of equal driving pulses at terminals 22 and 23 will maintain this state of asymmetry. In order to reverse it, it is merely necessary to apply a larger pulse to terminal 23, thereby driving core 18 beyond point 29 to point 34 permitting it to reside at point 35 upon completion of the switching action. Providing subsequent input pulses are of equal magnitude, the core will assume a second state of asymmetry traversing the hysteresis loop from point 35 through 32, 33, 34, and back to 35. It is seen, therefore, that two distinct states exist in this magnetic core circuit, which may be utilized.

Figure 5:
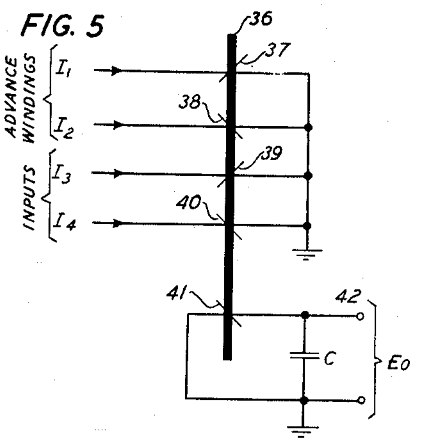
FIG. 5 is a schematic diagram of an illustrative embodiment of the invention when used as a flip-flop with two inputs.
Figure 6:
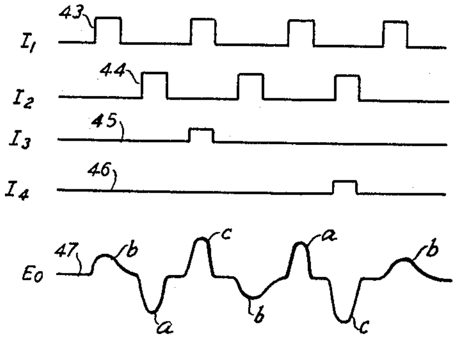
FIG. 6 is a diagrammatic comparison of the wave shapes present at critical points in the circuitry of FIG. 5.

FIG. 5 is the symbolic representation of an illustrative embodiment of this invention when used as a flip-flop circuit. This circuit will be seen to comprise a magnetic core 36 containing two advance windings 37 and 38 supplied by currents $I_1$ and $I_2$, and two set windings 39 and 40 supplied by currents $I_3$ and $I_4$, respectively. The waveforms of these currents are depicted in FIG. 6 wherein $I_1$ is represented by waveform 43, $I_2$ by 44, $I_3$ by 45, and $I_4$ by 46. $I_1$ and $I_2$ are equal in amplitude and $I_3$ and $I_4$ are of such amplitude that their occurrence in phase with a pulse of $I_1$ or $I_2$ will change the state of operation of the magnetic core circuit. The energy storage means necessary has again been depicted in FIG. 5 as a capacitor, C, which is inductively coupled to magnetic core 36 via winding 41.

The actual operation of this circuit is self-evident in view of the material hereinbefore discussed. Starting at an arbitrary time and assuming an initial state of operation in the second mode, the first pulse of current $I_1$ will first set the core to positive magnetic polarity via winding 37, causing a voltage, $E_o$, to appear at terminal 42, shown in waveform 47, FIG. 6, as the first pulse. The first pulse of current $I_2$ will then switch core 36 to a negative polarity via winding 38, the output voltage being noted as the second pulse of waveform 47. Upon occurrence of the second pulse of current $I_1$, it will be seen that coincidently an $I_3$ pulse appears which is applied via winding 39 and aids $I_1$ in switching the core. The magnetic core 36, therefore, is driven hard into the positive saturation region to a point such as that depicted as point 31 on the hysteresis loop in FIG. 2. The second $I_2$ pulse, therefore, will not be able to completely overcome this state, switching the core negatively only to point 29 on the hysteresis loop. Thus, as illustrated in waveform 47, FIG. 6, an asymmetric voltage output exists with the positive voltage peaks being superior to the negative peaks. This continues until the third pulse of current $I_2$ at which time an aiding $I_4$ pulse appears and the core 36 is driven into a negative saturation state illustrated on the hysteresis loop as point 34, causing, while doing so, a large negative voltage pulse at output terminal 42 in accordance with the hereinbefore discussed operation of this circuit. This new asymmetric state of operation will continue until another pulse appears on line $I_3$.

Figure 4:
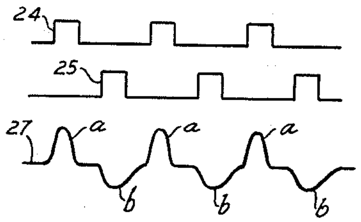
FIG. 4 shows a diagrammatic comparison of the wave shapes present at the inputs and output of the circuit depicted in FIG. 3.

There are three distinct forms of output pulse illustrated in FIGS. 4 and 6. Two, *a* and *b*, are those produced in response to the occurrence of driving pulses, and a third, *c*, is produced in response to the occurrence of a setting pulse. The areas of pulse forms *a* and *b* are equal, whereas the area of pulse form *c* is greater than either by an amount determined by the energy of the setting pulses. The particular state in which the magnetic core circuit is operating may be detected by many well-known means, including voltage level detectors and oscilloscopes.

It should be noted that, although two advance or drive windings have been employed in the illustrations of this invention, other means of alternately reversing the polarity of the magnetic core may be employed, for example a single winding upon which pulses of alternating polarity are impressed. Similarly, the setting means may be varied, or may be included directly as part of the driving windings by providing a larger amplitude pulse in such windings when the magnetic state is to be switched. With these modifications in mind, it should be clear that this invention presents an efficient, simple, and economical means of providing bivalued information in an easily utilized form.

The above detailed description is merely an illustration of a specific embodiment of the invention and it is not intended to limit the invention to this embodiment. Other arrangements may be devised by those skilled in the art without departing from the spirit and scope of this invention.

What is claimed is:

1. A magnetic core circuit comprising a core of magnetic material exhibiting a substantially rectangular hysteresis characteristic, driving means for alternately establishing magnetic fields of opposite polarity and preselected flux density in said core, energy storage means co-acting with said driving means to drive said core further toward saturation of the existing polarity, and setting means operative coincidentally with said driving means to increase the remanent flux density of said core in a predetermined polarity during a first particular cycle of operation.

2. The magnetic core circuit defined in claim 1 in combination with second setting means operative coincidentally with said driving means to increase the remanent flux density of said core in a polarity opposite to said predetermined polarity during a second particular cycle of operation.

3. A magnetic core circuit comprising a core of magnetic material exhibiting a substantially rectangular hysteresis characteristic, means for alternately applying equal magnetomotive forces of opposite polarity to said core, energy storage means co-acting with said applying means and operative upon completion by said applied magnetomotive forces of their contribution to the total switching action to increase the magnetic flux density caused thereby, and means coupled to said core for selectively increasing the remanent flux density within said core in any polarity.

4. A magnetic core circuit comprising a core of magnetic material exhibiting a substantially rectangular hysteresis characteristic, driving means supplying pulses for ultimately establishing nonsaturated magnetic fields of opposite polarity in said core, energy storage means coacting with said driving means and operative upon cessation of the contribution to the total switching action by each of said pulses to increase the flux density of the core in the existing polarity, and means for momentarily increasing the remanent magnetic flux density in either polarity whereby an asymmetric waveform is established across said energy storage means.

5. A flip-flop circuit comprising a magnetic core having two polarities of remanent magnetization, a first coil inductively coupled to said core and energized by input pulses to establish a nonsaturated magnetic field of a first polarity, a second coil inductively coupled to said core and energized in alternate order with said first coil to establish a nonsaturated magnetic field of a second polarity, a third coil inductively coupled to said core, an energy storage means connected to said third coil and supplied by said third coil during energization of either of said first two coils, said coils disposed on said core in such relation that the energy stored in said storage means causes a current flow in said third coil which increases the magnetic flux density in the polarity established by the preceding input pulse, and means for selectively increasing said current flow thereby increasing the remanent magnetic flux density in the polarity established by said preceding input pulse.

6. A flip-flop circuit comprising a magnetic core capable of assuming bi-stable states of magnetic remanence, a pair of input coils inductively coupled to said core and alternately energized by switching pulses of equal magnitude and opposite polarity for alternately establishing nonsaturated magnetic fields of opposite polarities, setting means for momentarily changing the magnitude of one of said switching pulses thereby increasing the remanent magnetic flux density resulting from said one switching pulse, a third coil inductively coupled to said core, and energy storage means connected to said third coil and supplied by said third coil during energization of either of said input coils, said coils disposed on said core in such relation that the energy stored in said storage means causes a current flow through said third coil following attainment of maximum voltage caused by the most recent switching pulse thereby enhancing the switching action thereof.

7. A flip-flop circuit as defined by claim 6 wherein said setting means comprises a coil inductively coupled to said core and supplied by a pulse occurring in phase with the input pulse changed.

8. A magnetic core circuit comprising a core of magnetic material exhibiting a substantially rectangular hysteresis characteristic, driving means supplying pulses for alternately establishing nonsaturated magnetic fluxes of opposite polarity in said core, and energy storage means electrically isolated from said driving means and operatively coordinated therewith to increase the remanent magnetic flux density established by said driving means.

References Cited in the file of this patent

UNITED STATES PATENTS

| | | |
|---|---|---|
| 2,813,260 | Kaplan | Nov. 12, 1957 |
| 2,819,412 | Kaplan | Jan. 7, 1958 |
| 2,847,659 | Kaiser | Apr. 12, 1958 |
| 2,832,062 | Tracy | Apr. 22, 1958 |